United States Patent
Li et al.

(10) Patent No.: US 10,568,460 B2
(45) Date of Patent: Feb. 25, 2020

(54) PORTABLE ELECTRIC GRILL HAVING A DOMED LID AND METHOD OF USE

(71) Applicants: George T. C. Li, Reno, NV (US); Eric Li, Martinsville, VA (US)

(72) Inventors: George T. C. Li, Reno, NV (US); Eric Li, Martinsville, VA (US)

(73) Assignee: LAM & SONS, LLC, Cheyenne, WY (US)

( * ) Notice: Subject to any disclaimer, the term of this patent is extended or adjusted under 35 U.S.C. 154(b) by 4 days.

(21) Appl. No.: 15/724,257

(22) Filed: Oct. 3, 2017

(65) Prior Publication Data

US 2019/0099039 A1    Apr. 4, 2019

(51) Int. Cl.
*A47J 37/07* (2006.01)
*A47J 37/06* (2006.01)
*A23L 5/10* (2016.01)

(52) U.S. Cl.
CPC .............. *A47J 37/0629* (2013.01); *A23L 5/15* (2016.08); *A47J 37/0709* (2013.01); *A47J 37/0763* (2013.01); *A47J 37/0786* (2013.01); *A47J 2202/00* (2013.01)

(58) Field of Classification Search
CPC . A23L 5/10; A23L 5/15; A47J 37/0676; A47J 37/0629–0635; A47J 37/079; A47J 37/0722; A47J 37/07–0795; A47J 2202/00; A47J 2037/0777
USPC ........... 426/523; 99/422, 425, 444–446, 450, 99/378, 375
See application file for complete search history.

(56) References Cited

U.S. PATENT DOCUMENTS

| | | | | |
|---|---|---|---|---|
| 1,690,570 A | * | 11/1928 | Dalbey, Sr. | A47J 37/0676 126/40 |
| 2,135,318 A | * | 11/1938 | Barkinsky | A47J 37/103 99/446 |
| 2,187,888 A | * | 1/1940 | Nachumsohn | A47J 37/015 126/275 E |
| 2,397,478 A | * | 4/1946 | Drechsler | A47J 37/015 126/275 R |
| 2,811,915 A | * | 11/1957 | Sarkisian | A47J 37/041 99/421 HH |
| 2,990,286 A | * | 6/1961 | Clarke | A47J 36/2494 219/441 |
| 3,010,383 A | * | 11/1961 | Greene | A47J 37/0611 219/524 |
| 3,227,067 A | * | 1/1966 | Langs | A47J 27/04 99/331 |

(Continued)

*Primary Examiner* — Drew E Becker
(74) *Attorney, Agent, or Firm* — Donn K. Harms

(57) ABSTRACT

A portable electric grill and method of use are described. The grill includes a double walled dome lid, a basin having a cavity, a grill that interfaces with the basin, a first heating element, a second heating element, a temperature controlling component, and a support that interfaces with a surface. The double walled dome lid includes a dome lid inner wall and a dome lid outer wall. The dome lid inner wall and the dome lid outer wall are joined at a base of the double walled dome lid. The basin interfaces with the base of the double walled dome lid, and the basin includes a hinge coupling the basin and the double walled dome lid. The first heating element is radially disposed about an exterior surface of the dome lid inner wall and within the dome lid outer wall. The second heating element is disposed within the basin cavity.

20 Claims, 11 Drawing Sheets

(56) References Cited

U.S. PATENT DOCUMENTS

| | | | | |
|---|---|---|---|---|
| 3,586,516 A * | 6/1971 | Terc | A23B 4/07 | 219/400 |
| 3,611,912 A * | 10/1971 | Choc | A47J 37/0718 | 126/25 R |
| 3,943,332 A * | 3/1976 | Marsh | A47J 37/0611 | 219/520 |
| 3,959,620 A * | 5/1976 | Stephen, Jr. | A47J 37/0709 | 219/386 |
| 4,126,087 A * | 11/1978 | McLamb | A47J 37/06 | 99/327 |
| 4,430,559 A * | 2/1984 | Rabay | A47J 37/0676 | 126/25 R |
| 4,434,781 A * | 3/1984 | Koziol | A47J 37/0713 | 126/25 R |
| 4,627,410 A * | 12/1986 | Jung | A47J 37/041 | 126/19 R |
| 5,467,695 A * | 11/1995 | Keller | A47J 37/0781 | 126/39 H |
| 5,582,094 A * | 12/1996 | Peterson | A47J 37/0786 | 126/25 R |
| 5,720,272 A * | 2/1998 | Chiang | A47J 37/0786 | 126/25 R |
| 5,896,808 A * | 4/1999 | Graur | A47J 37/0623 | 219/386 |
| 5,907,994 A * | 6/1999 | Dotan | A47J 37/043 | 219/388 |
| 5,968,387 A * | 10/1999 | Guerrier | A47J 37/0664 | 219/392 |
| 5,975,073 A * | 11/1999 | Kuo | A47J 37/0623 | 126/275 R |
| 5,990,454 A * | 11/1999 | Westerberg | H05B 3/0076 | 219/411 |
| 6,012,444 A * | 1/2000 | Skender | F24C 3/087 | 126/21 A |
| 6,104,004 A * | 8/2000 | Ragland | A47J 37/0635 | 219/386 |
| 6,182,560 B1 * | 2/2001 | Andress | A47J 37/0718 | 126/25 R |
| 6,509,550 B1 * | 1/2003 | Li | A47J 27/004 | 219/386 |
| 6,686,569 B2 * | 2/2004 | Li | A47J 27/004 | 219/386 |
| 6,758,132 B1 * | 7/2004 | Kuo | A47J 37/0676 | 219/386 |
| 6,884,971 B2 * | 4/2005 | Li | A47J 27/004 | 219/386 |
| 7,012,221 B2 * | 3/2006 | Li | A47J 27/004 | 219/386 |
| 7,301,127 B1 * | 11/2007 | Derridinger, Jr. | A47J 37/0709 | 219/386 |
| 7,339,137 B1 * | 3/2008 | Sorenson | A47J 37/0709 | 219/386 |
| 7,640,929 B2 * | 1/2010 | Johnson | A47J 36/06 | 126/41 R |
| 8,166,870 B2 * | 5/2012 | Badin | A47J 37/0713 | 126/25 R |
| 9,756,980 B1 * | 9/2017 | Li | A47J 37/0629 | |
| 2006/0278210 A1 * | 12/2006 | Wang | A47J 37/0635 | 126/25 R |
| 2010/0147159 A1 * | 6/2010 | Fossati | A47J 37/0676 | 99/339 |
| 2013/0055906 A1 * | 3/2013 | Kanbur | A47J 37/0623 | 99/419 |
| 2014/0246420 A1 * | 9/2014 | Paget | A47J 43/044 | 219/438 |
| 2016/0120362 A1 * | 5/2016 | Fields | A47J 37/0807 | 99/378 |
| 2017/0251872 A1 * | 9/2017 | Li | A47J 37/0629 | |
| 2017/0295993 A1 * | 10/2017 | Li | A23L 5/15 | |

* cited by examiner

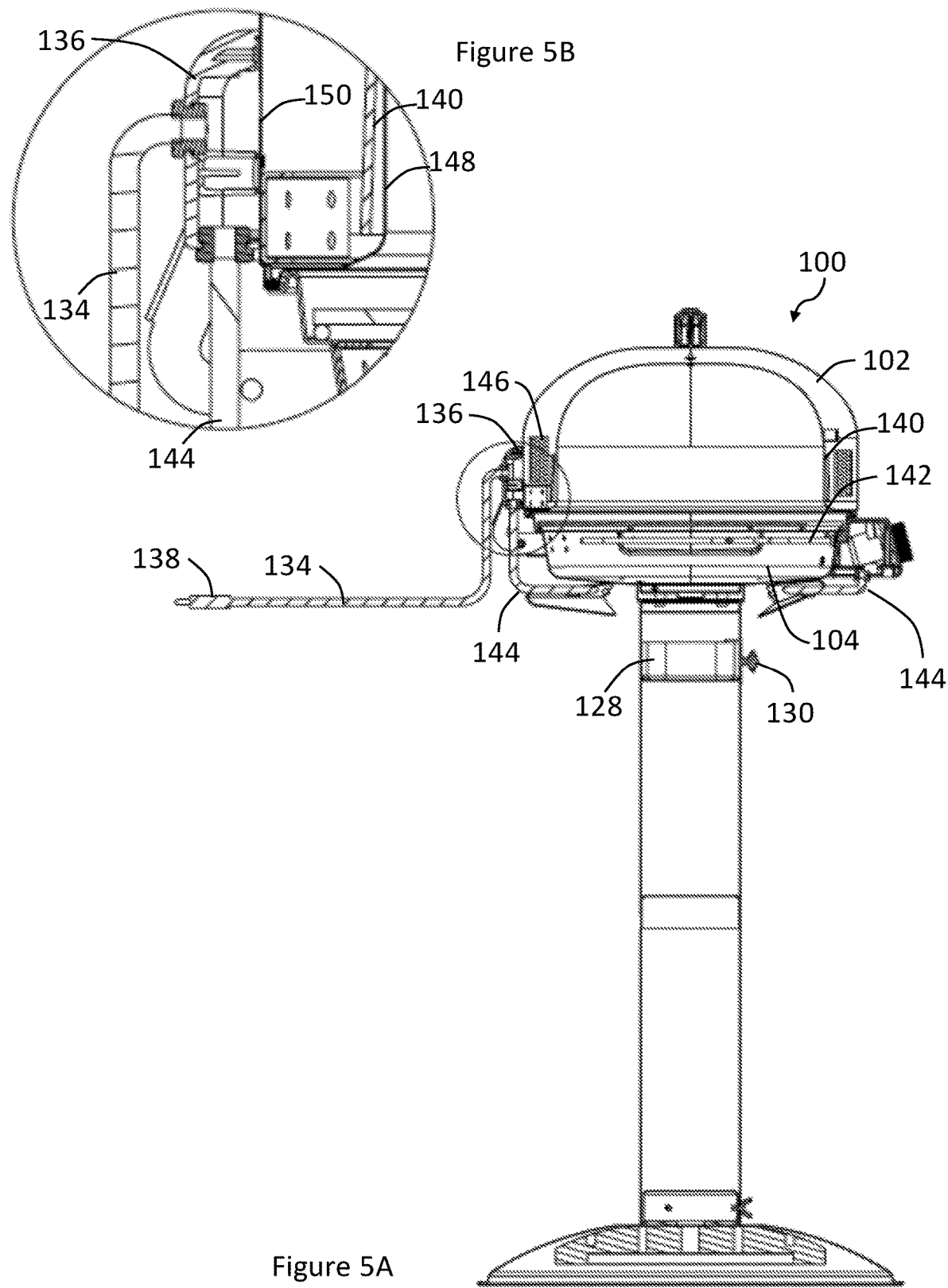

PORTABLE ELECTRIC GRILL HAVING A DOMED LID AND METHOD OF USE

FIELD

The present disclosure relates to a portable electric grill system and method. More particularly, the present disclosure relates to a portable electric grill having a dome shaped lid that includes a heating element disposed within the dome shaped lid.

BACKGROUND

A variety of stand-alone grills have been developed to cook different food products (e.g., turkey, chicken, and the like) without the use of a conventional kitchen oven or outdoor grill. These stand-alone grills vary widely depending on their intended use and are referred to herein as "Grillers" or "Grills." Grills intended for use outdoors or camping typically utilize gas heating elements and windbreaks or lids. Grills intended for indoor use typically utilize electric heating elements.

Stand-alone grills offer a variety of conveniences including being an energy-efficient alternative to turning on the full-size kitchen oven or multi-burner outdoor grill. Grills also provide an extra indoor or outdoor cooking space during the holidays. Grills may also be used for baking, cooking and serving. Grills may include a lid that helps trap in heat and moisture. When the lid is removed, the Grill provides convenient access to rotate or transfer food to an individual serving dish. Generally, the Grill also includes a removable rack, tray or grill to ease cleaning and allow for the movement of large roasts or turkeys to a serving platter.

Typical Grills apply heat to food products from below the grill or rack via a bottom heating element arranged in functional relation to the bottom of the Grill, which supports the grill or rack. As such, Grills are often constructed of aluminum, stainless steel or enameled steel for reasons of durability and sanitation. However, food product heated directly from the bottom requires multiple flips to achieve even, uniform cooking.

This issue of heat transference presents a particular problem for cooking in large capacity Grills (i.e. up to 26 quarts). Applying heat only to the bottom in such a large capacity Grill can result in the upper portion of a turkey or chicken or food product placed on upper racks being undercooked. Thus, the food in the upper portion of the cooking vessel may be insufficiently cooked for serving purposes due to the loss of heat in combination with the slow rate at which heat is supplied to the upper portion of the Grill. Often such a cooking vessel lacks top-browning (i.e. to scorch lightly) capability, which is desirable when cooking chicken, turkey or other large foodstuffs.

Traditional Grills are unable to effectively brown the top of large birds such as an illustrative turkey, which results in a "white spot" on the top of the large bird. Two characteristics of traditional Grills that may lead to "white spots" are an insufficient maximum achievable cooking temperature (e.g. 450 degrees Fahrenheit for traditional Grills) and too long a time period required to achieve this temperature in a cooking chamber (20-30 minutes for traditional Grills). To effectively remove the white spot, the illustrative turkey is removed from the Grill and put into a regular oven for roasting. This two-step process creates additional work and clean-up and the extra step of cooking in a traditional oven causes the illustrative turkey to lose its moisture and tenderness. Similarly, smaller food products, such as burgers and hot dogs, placed on upper racks are not efficiently cooked due in part to the distance from a bottom heating source. Basically, a properly browned turkey that is exposed to the two-step process of using a Grill and then a kitchen oven is dry and unappetizing, while smaller food products on upper racks must cook for much longer, and smaller food products on lower racks must be flipped and attended repeatedly to prevent burning or scorching.

Thus, a stand-alone grill capable of efficiently and uniformly roasting and browning a top surface of a large food product is desirable. Such a stand-alone grill would be capable of achieving a cooking chamber temperature in excess of 450 degrees Fahrenheit in 10 minutes or less. A stand-alone grill that quickly and efficiently cooks both large single food products and multiple small food products on racks at one or more distances from the heat source is also desirable.

SUMMARY

A portable electric grill and method of use are described. The portable electric grill includes a double walled dome lid, a basin having a cavity, a grill that interfaces with the basin, a first heating element, a second heating element, a temperature controlling component, and a support that interfaces with a surface. The double walled dome lid includes a dome lid inner wall and a dome lid outer wall. The dome lid inner wall and the dome lid outer wall are joined at a base of the double walled dome lid. The basin interfaces with the base of the double walled dome lid, and the basin includes a hinge coupling the basin and the double walled dome lid. The temperature controlling component is electrically coupled to the first heating element and the second heating element. The first heating element is radially disposed about an exterior surface of the dome lid inner wall and within the dome lid outer wall. The second heating element is disposed within the basin cavity.

In one illustrative embodiment, the support includes a plurality of legs that interface with a surface, wherein each of the legs has a hinge. In another embodiment, the support includes a pedestal. In a further embodiment, the pedestal includes an oil reservoir operatively coupled to a drain in the basin.

A method for cooking with a portable electric grill is described. The method includes receiving a food product on a grill interfacing with a basin, wherein the basin has a cavity and a support. The method further includes covering the grill with a double walled dome lid that includes a dome lid inner wall and a dome lid outer wall, wherein the dome lid inner wall and the dome lid outer wall are joined at a base of the double walled dome lid, further wherein the base interfaces with the basin to form a cooking chamber. The method continues by receiving a cooking input at a temperature controlling component that includes a first heating element and a second heating element, wherein the first heating element is radially disposed about an exterior surface of the dome lid inner wall and the first heating element positioned within the dome lid outer wall, and the second heating element is disposed within the basin cavity. The method then terminates by heating the cooking chamber with at least one of the first heating element and the second heating element so that the food product is uniformly cooked.

FIGURES

The present invention will be more fully understood by reference to the following drawings which are presented for illustrative, not limiting, purposes.

FIG. 5A shows a cut-away side view of a portable electric grill mounted on a pedestal as disclosed herein and in accordance with various embodiments.

FIG. 5B shows an exploded cut-away side view of a hinge as disclosed herein and in accordance with various embodiments.

DESCRIPTION

Figure 1:
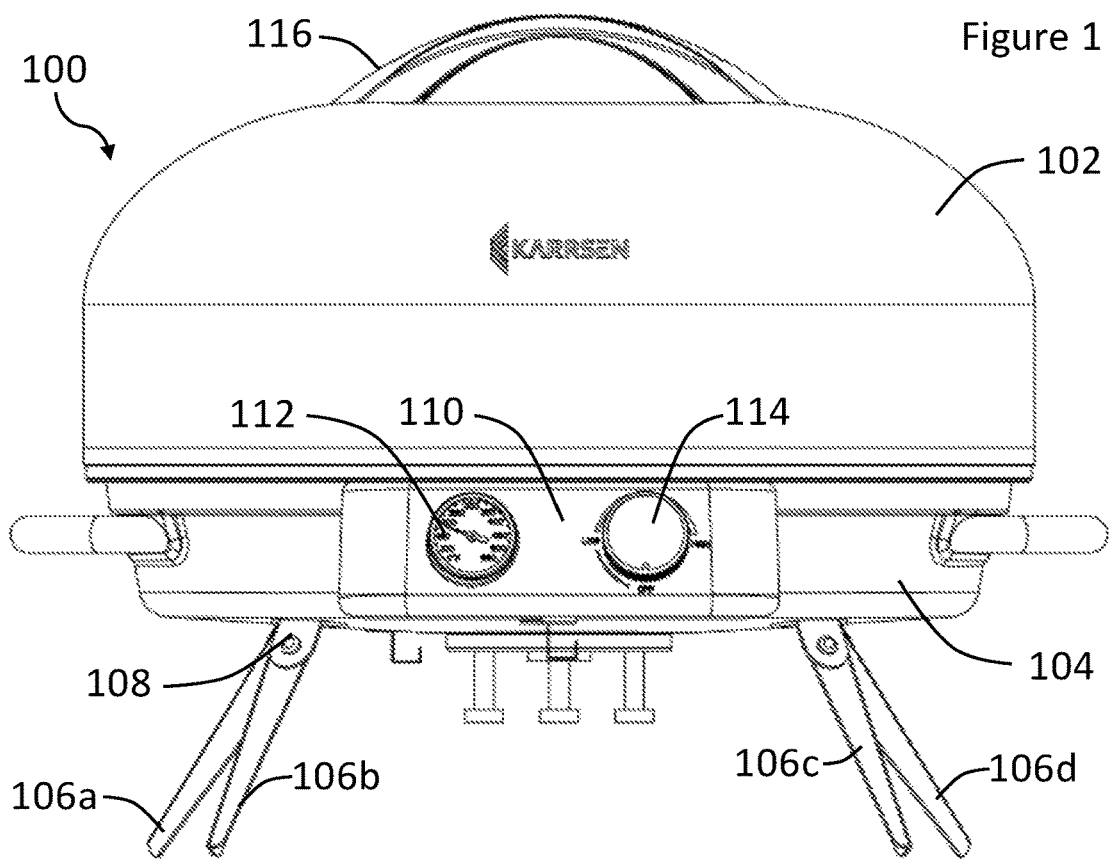
FIG. 1 shows a front view of a portable electric grill having support legs as disclosed herein and in accordance with various embodiments.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. The following detailed description of the illustrative embodiments includes reference to the accompanying drawings, which form a part of this application. The drawings show, by way of illustration, specific embodiments in which the invention may be practiced. It is to be understood that other embodiments may be utilized and structural changes may be made without departing from the scope of the claims.

In various embodiments, the portable electric grill disclosed herein can include a double walled dome lid that interfaces with a basin, the basin having a cavity, a hinge coupling the basin and the double walled dome lid, a grill configured to interface with the basin cavity, a first heating element that is radially disposed about an exterior surface of the dome lid inner wall and within the dome lid outer wall, a second heating element disposed within the basin cavity, a temperature controlling component, and a support.

The dome lid can further comprise a large and heavy lid configured to retain heat energy. The first heating element can be disposed within and about a perimeter of the dome lid and extend from a base of the dome lid to a particular height above the base of the dome lid. The first heating element can thus comprise a "belt" that extends within the dome lid between the outer and inner lid walls about a perimeter of the dome lid. The first heating element can be a resistive heating element.

In operation, the food product can be placed on the grill and covered by the dome lid to enclose the food product between the grill and dome lid. The space enclosed between the grill and dome lid may be referred to herein as a "heating chamber," a "cooking chamber," or simply a "chamber." A cooking input can be received at a temperature controlling component disposed within the dome lid, and one or both of the first and second heating elements can, in response to the cooking input, heat the chamber of the portable electric grill based upon the selected cooking input. The second heating element can be a tube heater, an electrically resistive heater, or any other suitable heating element.

The dome lid can retain and distribute heat over the surface of the food product, and in particular, over much of the food product, including the top surface (e.g., in the case of a turkey, over the turkey breast) of the food product. Moreover, in some embodiments, because the first heating element is disposed within the dome lid, the stand-alone grill disclosed herein can uniformly roast and/or brown the food product without exposing the food product to direct heat or in combination with direct heat applied through the second heating element. The food product may not therefore scorch or burn. The inventors' hypothesize that because the dome lid is quite heavy, that the stand-alone grill is able to develop and maintain an internal pressure that is greater than the air pressure outside of the Grill. The Grill can therefore operate, to some extent, as a pressure cooker. A food product disposed within the cooking chamber can thus brown uniformly as well as retain its juiciness during cooking.

With reference now to FIG. 1, a front view of an illustrative portable electric grill 100 is shown. In the illustrative embodiment, the portable electric grill 100 can generally comprise a dome lid 102 and a basin 104, wherein the basin 104 is supported by legs 106a, 106b, 106c, and 106d. Each leg 106 is movably affixed to the basin 104 by a hinge or bolt and bracket 108. The fold out legs 106 can be folded substantially flat against the exterior surface of the basin 104, and the fold out legs 106 can extend, as shown, a short distance away from the exterior surface of the basin 104. The legs 106 can raise the portable electric grill 100 a small distance above a support surface (e.g., a kitchen counter, picnic table, or other surface), such that air is free to circulate under the portable electric grill 100. The portable electric grill 100 can therefore rest on a variety of support surfaces without the risk of burning or damaging those support surfaces.

The basin 104 may include a temperature controlling component 110 housing a temperature indicator 112 and a temperature controller 114. The temperature indicator 112 monitors and displays the temperature inside the cooking chamber. The temperature controlling component 110 can be variously disposed within and/or about the portable electric grill 100, such as, for example, within the dome lid 102. The dome lid 102 can interface with the basin 104 at a base of the dome lid 102 to form a heating chamber. As described herein, a food product to be cooked and/or browned can be placed within the portable electric grill 100 by opening and closing the dome lid 102 with an affixed handle 116. A Grill operator can lift the dome lid 102 away from the base pan 104 using the handle 116 to expose the food product disposed within the portable electric grill 100 (and/or to place a food product within the portable electric grill 100). In addition, as described in greater detail below, the dome lid 102 can comprise a double walled dome lid.

In various embodiments, the fold out support legs 106 may be formed from aluminum, steel, enameled steel, or any other suitable material. The fold out legs 106 may strong, durable, and lightweight to allow for easy transportation by an operator.

In various embodiments, the dome lid 102 and basin 104 can comprise any metallic material such as sheet steel, aluminum, and/or chrome, any ceramic or partially ceramic material, any heat resistant glass, any heat resistant plastic, and/or any other suitable material.

The dome lid 102 can, as shown, rest on a relatively shallow basin 104 that provides a cavity housing a second heating element (not shown) and a grill (not shown). Accordingly, the dome lid 102 can cover a majority of the food product within the heating chamber, while the basin 104 can serve, in various embodiments, primarily to support the grill and house the second heating element. The dome lid 102 is therefore large and somewhat heavy. As such, and as described herein, the dome lid 102 is configured to store and radiate heat energy. The heavy dome lid 102 can, in addition, develop and maintain an internal air pressure within the heating chamber and, as a result, a high temperature within the heating chamber. In other words, the portable electric grill 100 can function as a pressure cooker, because the dome lid 102 is sufficiently heavy to maintain an internal air pressure without disruption to a seal formed between the dome lid 102 and the basin 104. A food product, such as a turkey, can therefore brown more uniformly over its outer surface (due to the high temperatures maintained within the heating chamber) as well as retain its juiciness and flavor (due to the air pressure developed within the heating chamber).

In various embodiments, the temperature controlling component 110 can comprise any suitable temperature input and control device, such as, for example, a temperature, brownness, or doneness selector, a thermostat, and/or a thermocouple. A thermostat is an electromechanical component that senses the temperature within the heating chamber of the portable electric grill 100, so that the internal temperature within the portable electric grill 100 is maintained at or near a desired set point. The thermostat does this by switching heating or cooling devices on or off. A thermocouple is an electrical device consisting of two different conductors forming electrical junctions at differing temperatures. A thermocouple produces a temperature-dependent voltage as a result of the thermoelectric effect, and this voltage can be interpreted to measure the internal temperature within the portable electric grill 100. The temperature controlling component 110 can comprise a control PCB and a digital display. The control PCB facilitates the digital display of the heating chamber temperature, the cooking mode, or other information to facilitate an operator's use of the portable electric grill 100.

An operator of the portable electric grill 100 can therefore set the temperature controlling component 110 to a desired temperature, a desired browning effect, a desired doneness (e.g., rare, medium rare, medium, well done, etc.), and the like. Having set the temperature controlling component 110, the temperature controlling component 110 can regulate (e.g., via the thermostat or thermocouple of the temperature controlling component 110) the temperature within the portable electric grill 100, as described in greater detail below.

Figure 2:
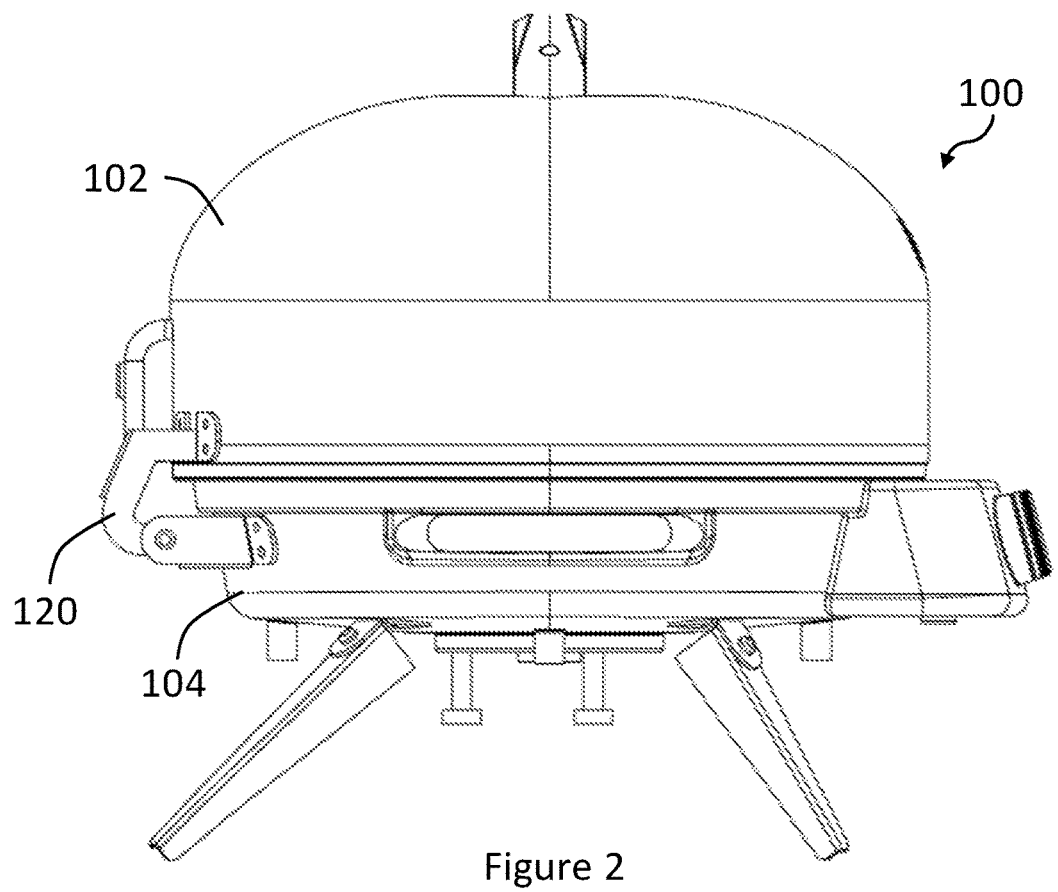
FIG. 2 shows a side view of a portable electric grill having support legs as disclosed herein and in accordance with various embodiments.

Referring to FIG. 2, a side view of a portable electric grill 100 is shown. In the illustrative embodiment, the portable electric grill 100 includes a lid hinge 120 coupling the basin 104 and the dome lid 102. In the illustrative embodiment, the hinge 120 is affixed to the dome lid 102 and affixed to the basin 104. The hinge 120 may be an exposed bolt and swivel or any other suitable hinge mechanism. The hinge 120 may be counterbalanced, spring-loaded, or pneumatically supported. In operation, the hinge 120 supports the dome lid 102 in an open state.

Figure 3:
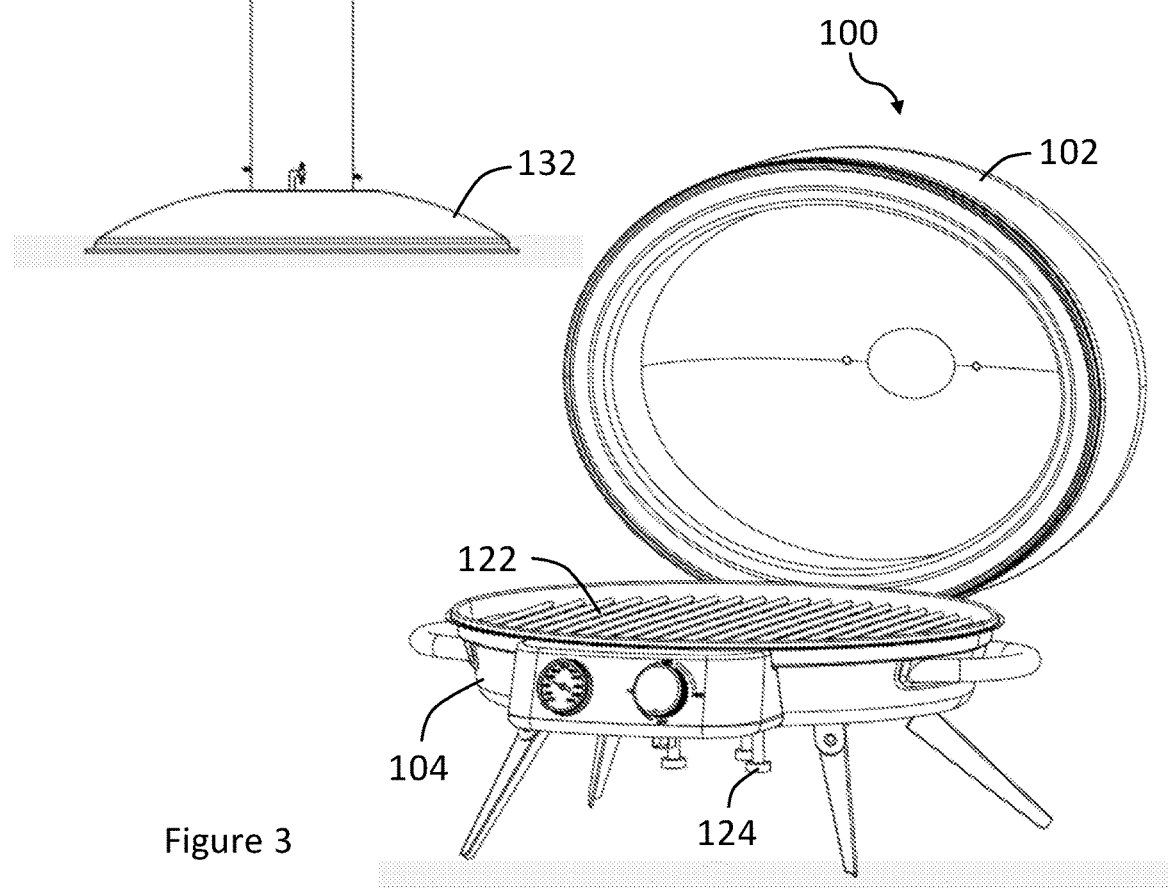
FIG. 3 shows a perspective view of a portable electric grill having support legs, wherein a doubled walled dome lid is open.

FIG. 3 shows a perspective view of an illustrative portable electric grill 100 in an open state. In the illustrative embodiment, a grill 122 rests within the basin 104, and mounting studs 124 configured to interface with a pedestal (not shown). As shown, an interior portion of the dome lid 102 can rise sharply away from the basin 104, such that the dome lid 102 defines, together with the basin 104, the heating chamber (as described herein) within which a food product can be placed for roasting and surface browning. The grill 122 can be seated in the basin 104, such that a food product placed on the grill 122 is elevated a slight distance above the second heating element (not shown). In various embodiments, the grill 122 can elevate the food product from between 0.2 inches above the second heating element (not shown) to 10 inches above the second heating element. Thus, as described herein, the portable electric grill 100 can comprise a basin 104 configured to interface with a dome lid 102 that rises from the basin 104 over the food product and grill 122 to encompass all of the food product. The dome lid 102 can fit over the basin 104 and grill 122 to ensure that the food product is adequately browned and cooked by the heating elements (described herein) disposed within the basin 104. The mounting studs 124 comprise steel, aluminum, or any suitable material.

The dome lid 102 can be placed by the portable electric grill 100 operator in an approximately vertical or position open state. Moreover, in a vertical position, the dome lid 102, which can become very hot during operation, can be safely and conveniently removed from the area surrounding the grill 122, so that the portable electric grill 100 operator is not burned or otherwise inconvenienced by the dome lid 102. As described above, the dome lid 102 can be somewhat large and heavy. The hinge 120 can therefore be sufficiently sturdy to support a large and heavy dome lid 102.

Figure 4:
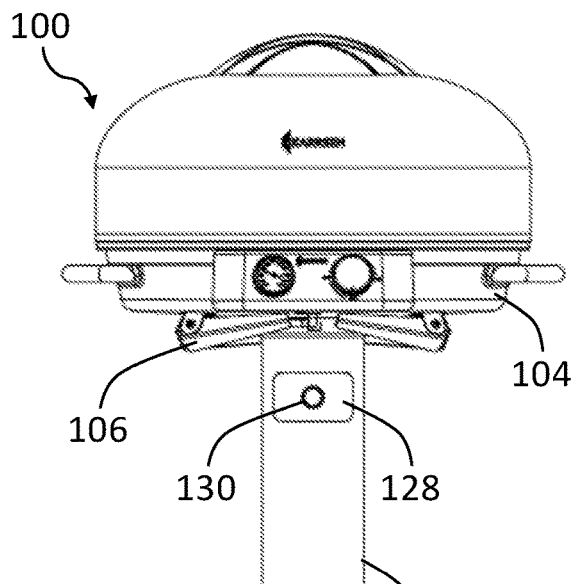
FIG. 4 shows a front view of a portable electric grill mounted on a pedestal as disclosed herein.

With reference now to FIG. 4, there is shown an illustrative embodiment of the portable electric grill 100 including a pedestal 126 interfacing with the basin 104 bottom through the mounting studs 124 in a removable manner. When supported by the pedestal 126, the fold out legs 106 may be collapsed against the basin 104 in a folded position. The pedestal 126 includes a removable trap 128 having a handle or knob 130, and pedestal base 132. The removable trap 128 is configured to receive oil and other waste produced by the portable electric grill 100 from a drain (not shown) in the bottom of the basin 104. The pedestal 126 can be formed of aluminum, steel, enameled steel, or any other suitable material. The pedestal can also be of a lighter weight than the pedestal base 132 to aid in stabilizing the portable electric grill 100 when mounted on the pedestal 126.

With reference now to FIG. 5A, there is shown a cutaway view of the portable electric grill 100 mounted on a pedestal 126, wherein a power cable 134 can extend from a power component 136. The power cable 134 can terminate in a plug connector 138, which can be electrically coupled to a standard AC power outlet (e.g., a 120-volt power outlet in North America). The power cable 134 can supply power to the portable electric grill 100, and in particular to the first heating element 140 in the dome lid 102 and the second heating element 142 within the basin 104. The illustrative embodiment can include a second power cable 144 coupling the power component to the temperature controlling component 110 and thereby providing power to the first 140 and second heating elements 142. In various embodiments, the power cable 134 can be wound and stowed about the foldout legs 106.

Referring now to FIG. 5B, there is shown an enlarged cutout view of the inner dome lid wall 148 and outer dome lid wall 150 of the dome lid 102. As shown, the inner dome lid wall 148 can be joined to the outer dome lid wall 150 at a base of the double walled dome lid 102 to form a chamber within which the first heating element 140 can be disposed. An insulating material (not shown) can be disposed within the chamber formed between the outer dome lid wall 150 and the inner dome lid wall 148. The inner dome lid wall 148 can be joined to the outer dome lid wall 150 with a tab to seal the inner dome lid wall 148 to the outer dome lid wall 150. Additionally, the inner dome lid wall 148 can be joined to the outer dome lid wall 150 by welding, by pressure, by one or more rivets or bolts, by a heat bonding technique, by way of a heat-resistant adhesive, and the like.

The first heating element 140 can generally extend within the dome lid 102 from a first edge of the dome lid 102 to a second edge of the dome lid 102, such that the first heating element 140 extends along an entire (or substantially an entire) perimeter of the dome lid 102. The first heating element 140 is therefore, in various embodiments, radially disposed about all or a portion of the dome lid 102. However, in various embodiments, the first heating element 140 can extend within any portion of the dome lid 102 that is less than the entire perimeter of the dome lid 102. Moreover, as shown, the first heating element 140 can extend within the dome lid 102 (i.e., between an exterior surface of the inner dome lid wall 148 and an interior surface of the outer dome lid wall 150) as a "belt" or "heating belt" that extends radially within the dome lid 102 and to a predetermined elevation or height above the base of the dome lid 102. In other words, the first heating element 140 can comprise a belt or strip disposed within the dome lid 102 between the inner dome lid wall 148 and the outer dome lid wall 150. The first heating element 140 can further extend from a base of the dome lid 102 to a predetermined height above the base of the dome lid 102, such that the heating element is not disposed in a top portion of the dome lid 102.

As a result of the location of the first heating element 140 within the dome lid 102, the portable electric grill 100 can apply indirect heat to the food product (including a top surface of the food product), so that the food product is uniformly browned, but not scorched by the first heating element 140. The heat energy generated by the first heating element 140 can, rather, be evenly (or substantially evenly) dispersed between the outer dome lid wall 150 and the inner dome lid wall 148. Therefore, as the heat generated by the first heating element 140 is contained and circulated within the dome lid 102, the heat can radiate more uniformly and with less intensity toward the food product, resulting in a uniformly browned, but not scorched, food product.

The first heating element 140 and the second heating element 142 can comprise any suitable heating element, such as, for example, an electric heating element. An electric heating element can comprise a metallic structure having a resistance to electric current that generates heat energy when the electric current is passed through the electric heating element. The electric current can be supplied by the power cable 134, which can draw electric current from an electrical wall outlet as described above. In one embodiment, the portable electric grill 100 includes a first heating element 140 that is an electrically resistive heating band extending about the exterior of the inner dome lid wall 148, and a second heating element 142 that is a tube heater. A user can select, indicate, or input a cooking method at the temperature controlling component 110 and the temperature knob 114. This selection can include a cooking method wherein the first heating element 140, the second heating element 142, and any combination thereof operates to cook a food product by heating the cooking chamber to the selected temperature, using the selected cooking method, such as Grill, Broil, and Bake. When the cooking method Grill is selected only the second heating element 142 operates to heat the cooking chamber to the selected temperature or some approximation thereof. When the cooking method Broil is selected only the first heating element 140 operates to heat the cooking chamber to the selected temperature or some approximation thereof. When the cooking method Bake is selected both the first heating element 140 and the second heating element 142 operate to heat the cooking chamber to the selected temperature. In some embodiments, one or both of the first heating element 140 and the second heating element are capable of heating the cooking chamber to 600 degrees Fahrenheit in approximately 8-10 minutes.

Moreover, although the first heating element 140 can be situated radially as a "belt" within the dome lid 102, the dome lid 102 can store substantial heat energy. Thus, as heat rises away from the first heating element 140 and/or the second heating element, much of the heat can be trapped internally within the structure of the dome lid 102 itself. As a result, the dome lid 102 can radiate stored heat energy by way of a convective (air circulating) process towards the top and over outer surfaces of the enclosed food product. The food product can therefore brown uniformly within the portable electric grill 100, notwithstanding the absence of a heating element directly overtop the food product.

The dome lid 102 may further comprise an insulating material 146 disposed within the dome lid 102. More particularly, as shown, the portion of the first heating element 140 that faces the outer dome lid wall 150 can be separated from the outer dome lid wall 150 by the insulating material 146, while the portion of the first heating element 140 that faces the inner dome lid wall 148 can do so without an intervening layer of insulating material. Thus, some of the heat generated by the first heating element 140 can be allowed to escape through the inner dome lid wall 148. This can help to dissipate some of the heat generated by the first heating element 140 into the heating chamber of the portable electric grill 100.

The first heating element 140 may also include a heating belt. By way of example and not of limitation, the portable electric grill 100 can include the insulating material 146, which can be radially disposed about the first heating element 140 and positioned within the outer dome lid wall 150, such that a top or upper portion of the dome lid 102 does not include the insulating material 146. Moreover, as described herein, the first heating element 140 as well as the insulating material 146 can extend substantially radially within the dome lid 102. In other words, the first heating element 140 and insulating material 146 can extend about a perimeter (or substantially about a perimeter) of the dome lid 102 and within the dome lid 102 between the inner dome lid wall 148 and the outer dome lid wall 150. The first heating element 140 and/or insulating material 146 can further extend from a base of the dome lid 102 to a predetermined height above the base of the dome lid 102.

In another illustrative heating belt embodiment, the insulating material 146 can extend from the base to the top of the dome lid 102. Thus, the insulating material 146 is disposed between the inner dome lid wall 148 and the outer dome lid wall 150. Also, the first heating element 140 is separated from contact with the outer dome lid wall 150 by the insulating material 146.

In a still further illustrative embodiment, the power component 136 is a junction box that receives the lead wires from the first heating element 140 and the second heating element 142. The junction box 136 is mounted on the rear or back of the dome lid 102 and, in the illustrative embodiment, cable 144 communicatively couples the junction box 136, the first heating element 140, the second heating element 142, and the temperature controlling component 110. The temperature controlling component 110 includes a sensing thermocouple located next to the grill 122 inside the basin 104. The temperature controlling component 110 controls the temperature within the heating chamber through the dial setting input at the control knob 114 by turning on and off the first heating element 140, the second heating element 142, and any combination thereof. In this manner, the temperature controlling component 110 controls the cooking chamber temperature to achieve and maintain the desired or selected temperature setting (i.e., low, medium, high, or some selected temperature).

Figure 6:
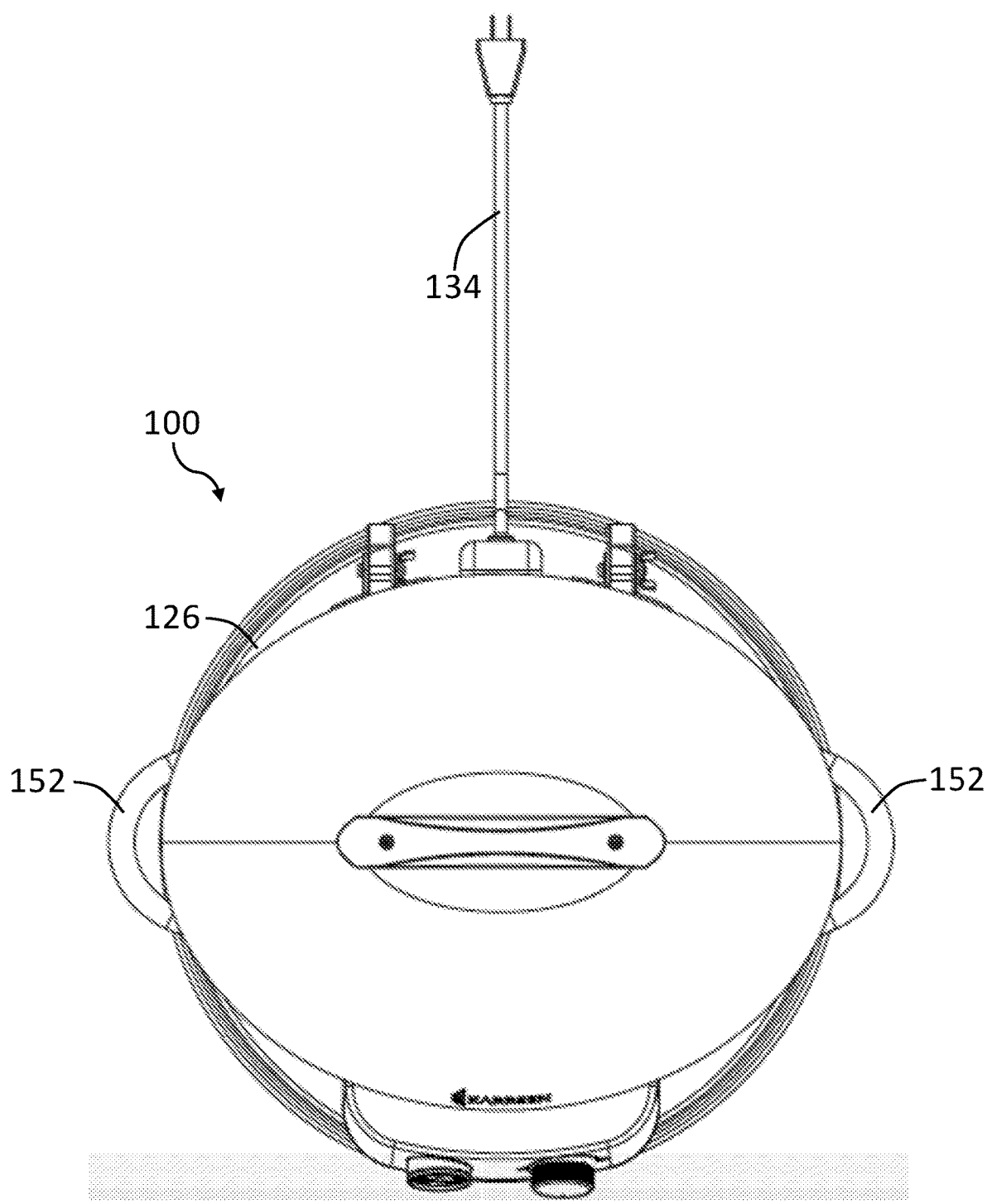
FIG. 6 shows a top view of a portable electric grill mounted on a pedestal as disclosed herein and in accordance with various embodiments.

With reference to FIG. 6, a top view of the portable electric grill 100 mounted on the pedestal 126, in which the power cable 134 is deployed, is shown. In the illustrative embodiment, side handles 152 are affixed to the basin 104 to facilitate moving and mounting the portable electric grill 100.

Figure 7:
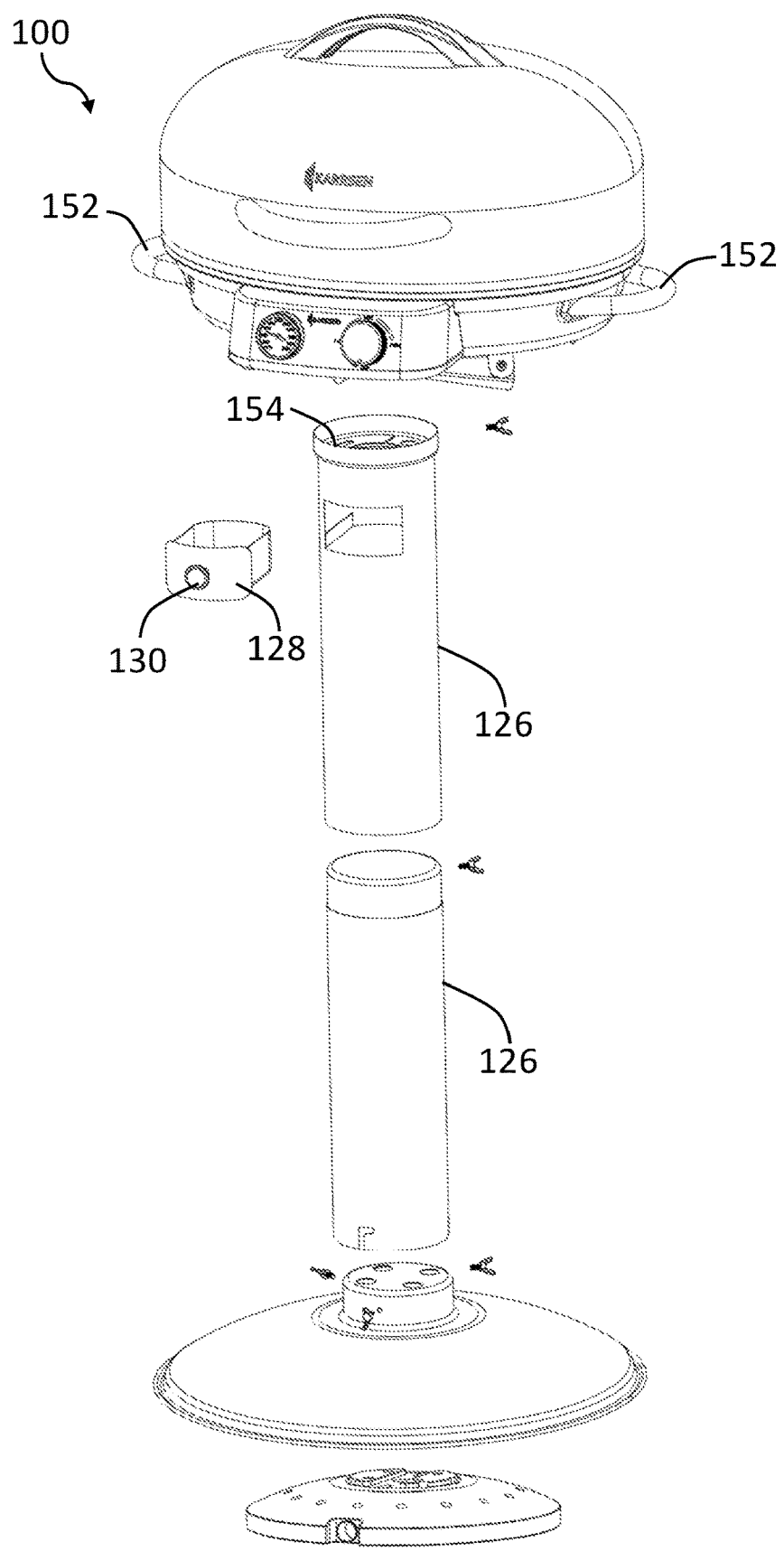
FIG. 7 shows a perspective view of a portable electric grill and pedestal components as disclosed herein and in accordance with various embodiments.

Referring now to FIG. 7, a partially exploded view of the portable electric grill 100 and pedestal components. In the illustrative embodiment, an operator of the portable electric grill 100 may safely remove the basin 104 and dome lid 102 from a pedestal mounting bracket 154 without injuring the operator or the portable electric grill 100. In the illustrative embodiment, the pedestal 126 may comprise several components including a pedestal mounting bracket 154 at the top of the pedestal 126 and the removable trap 128 having a handle or knob 130. The removable trap 128 rests and/or slides upon a tray or rail within the pedestal 126.

Figure 8:
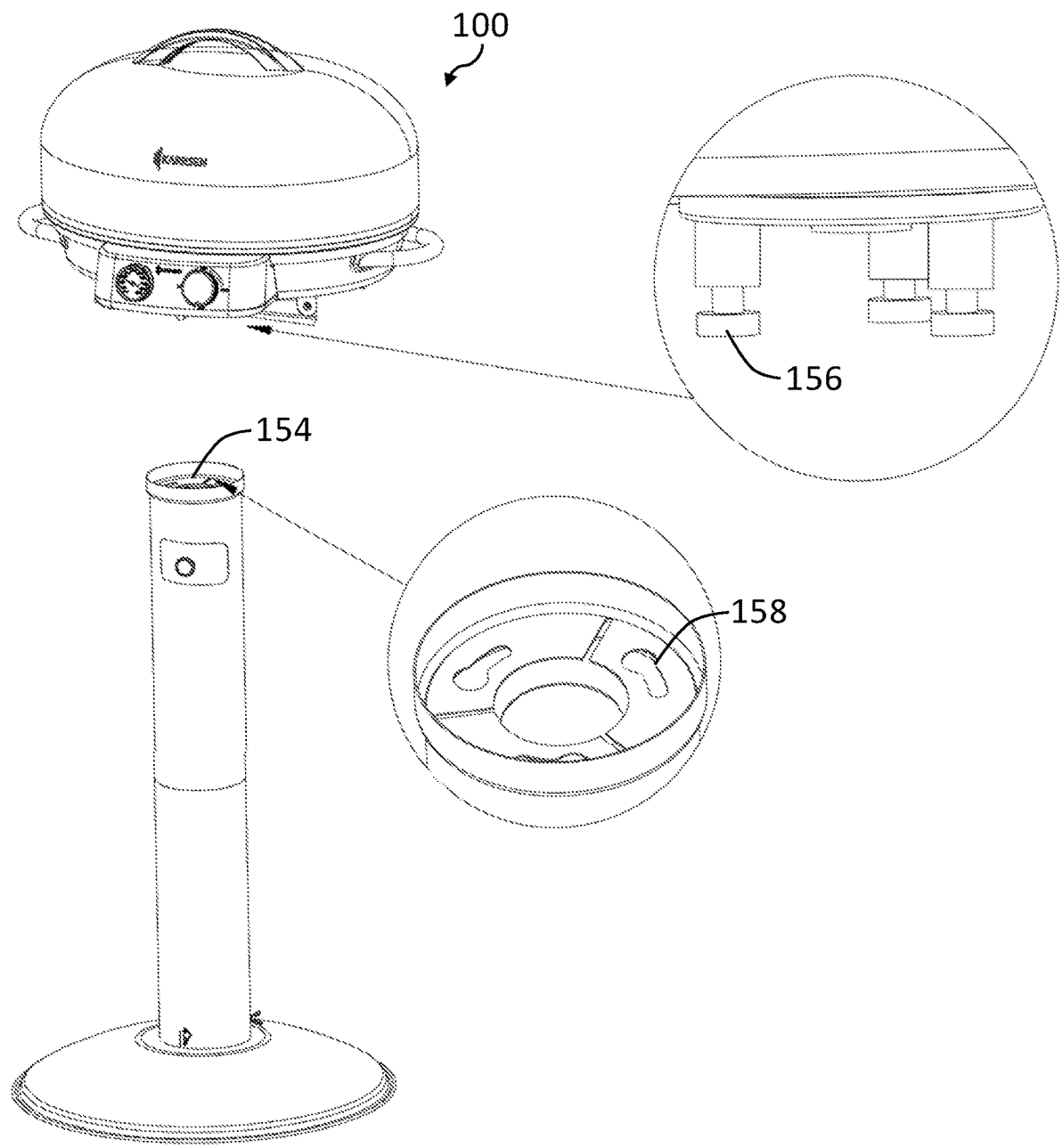
FIG. 8 shows expanded views of pedestal mounting components as disclosed herein and in accordance with various embodiments.

With reference now to FIG. 8, an exploded view of the bottom of the basin 104 shows the mounting studs 124 each having a locking head 156 configured to interface with the pedestal mounting bracket 154. The pedestal mounting bracket 154 includes a stud slot 158 corresponding to each mounting stud 124 on the basin 104. The stud slots 158 are configured to removably receive the mounting studs 124 so that the basin 104 and dome lid 102 are stably and removably affixed to the pedestal 126. In the illustrative embodiment, the stud slots 158 include a circular entry area having a diameter slightly greater than the diameter of the corresponding locking head 156 of the mounting stud 124, allowing the operator to thread the mounting studs 124 through the stud slots 158. The stud slots 158 can be further configured to have a narrow slot length trailing away from the entry area, wherein the narrow slot has a width wider than the mounting stud 124, but narrower than the locking head 156 diameter.

Figure 9:
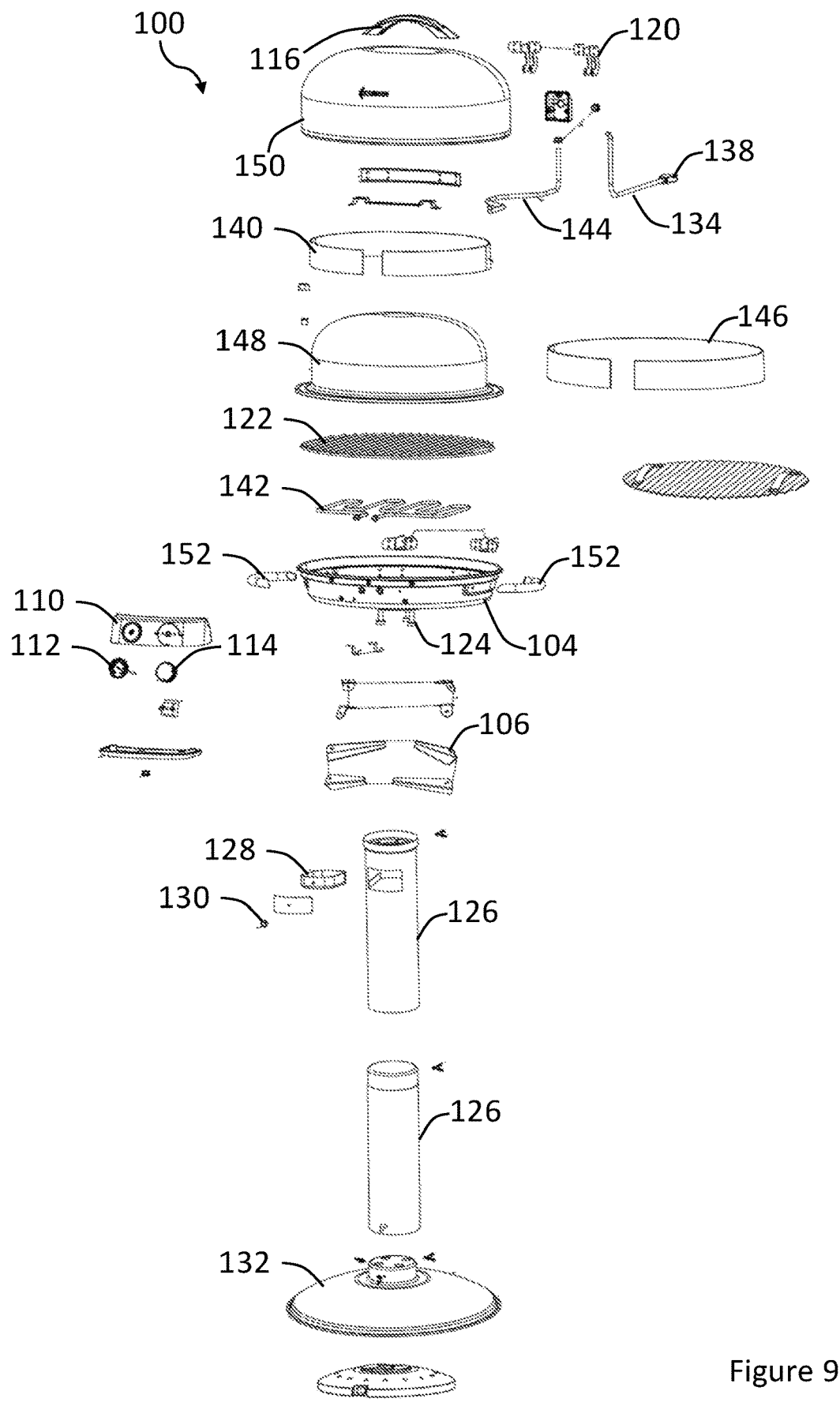
FIG. 9 shows an exploded view of a portable electric grill on a pedestal as disclosed herein and in accordance with various embodiments.

FIG. 9 shows an exploded view of the portable electric grill 100. From the top down, the portable electric grill 100 can comprise the lid handle 116, outer dome lid wall 150, the insulating material 146, the first heating element 140 (also termed "heating belt"), the inner dome lid wall 148, the hinge 120, the power cable 134 and the plug connector 138, the second power cable 144, the temperature controlling component 110 (comprising the temperature indicator 112 and the temperature controller or knob 114, in other embodiments the temperature controlling component 110 comprises a digital or LED readout (not shown) and a selector or button (not shown)), the grill 122, the second heating element 402, the basin 104, the side handles 152, the support legs 106, the pedestal 126, removable trap 128 having a handle or knob 130, and pedestal base 132. As described herein, the temperature controlling component 110 can comprise a thermostat or thermocouple. An operator of the portable electric grill 100 can adjust the temperature (or other cooking setting, such as brownness or doneness) using the temperature controller 114.

Figure 10:
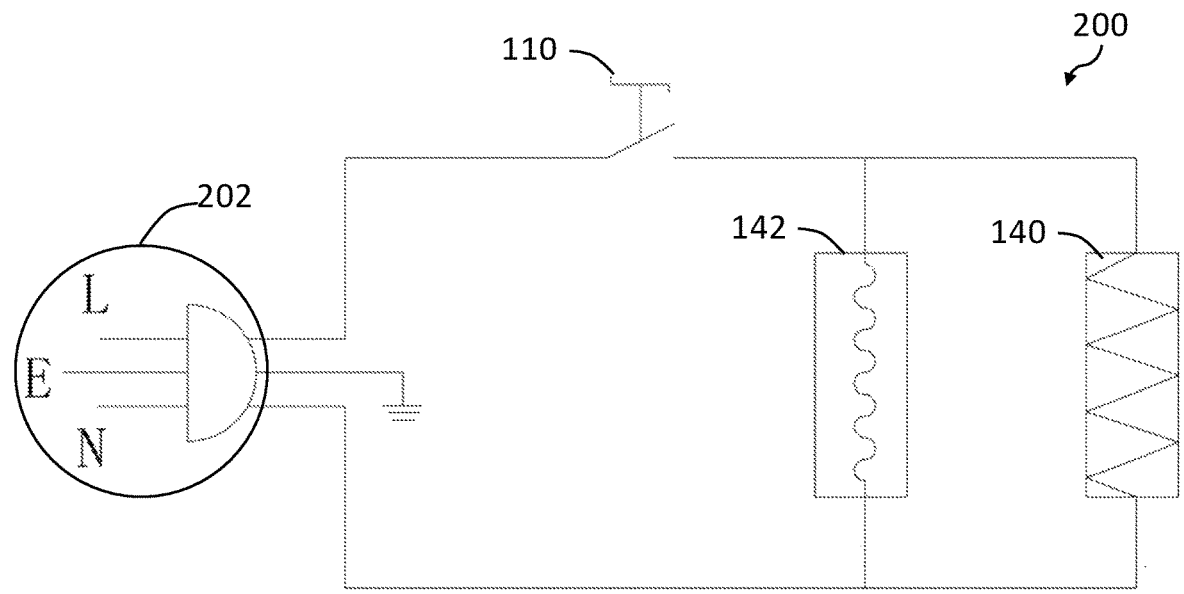
FIG. 10 shows an electrical circuit diagram of a portable electric grill as disclosed herein and in accordance with various embodiments.

With now reference to FIG. 10, an illustrative electrical circuit diagram 200 of the portable electric grill 100 is shown. In various embodiments, the portable electric grill 100 can comprise a power supply 202, the temperature controlling component 110, the first heating element 140, and the second heating element 142. The power supply 202 can be coupled, as described herein, to a wall outlet by way of the power cable 134. The power supply 202 can supply power to the temperature controlling component 110, the first heating element 140, and the second heating element 142. In various embodiments, and during operation, an operator of the portable electric grill 100 can adjust the temperature controlling component 110 (e.g., by way of the knob 114) to adjust the operating temperature of the portable electric grill 100. The first heating element 140 and the second heating element 142 can supply heat to the portable electric grill 100 based upon the cooking input and in response to a temperature detected or measured by a thermostat or thermocouple of the temperature controlling component 110. More particularly, the temperature controlling component 110 can comprise, in various embodiments a rheostat or potentiometer, which can be adjusted in response to a cooking input corresponding to a position of the knob 114. As the cooking input is increased or decreased, the power supplied to the first heating element 140 and the second heating element 142 can be adjusted by the temperature controlling component 110, so that the first heating element 140 and the second heating element 142 generates more or less heat. The power supplied to the first heating element 140 and the second heating element 142 can further be adjusted (e.g., increased or decreased) based upon a temperature measurement indicated by the temperature indicator 112.

Figure 11:
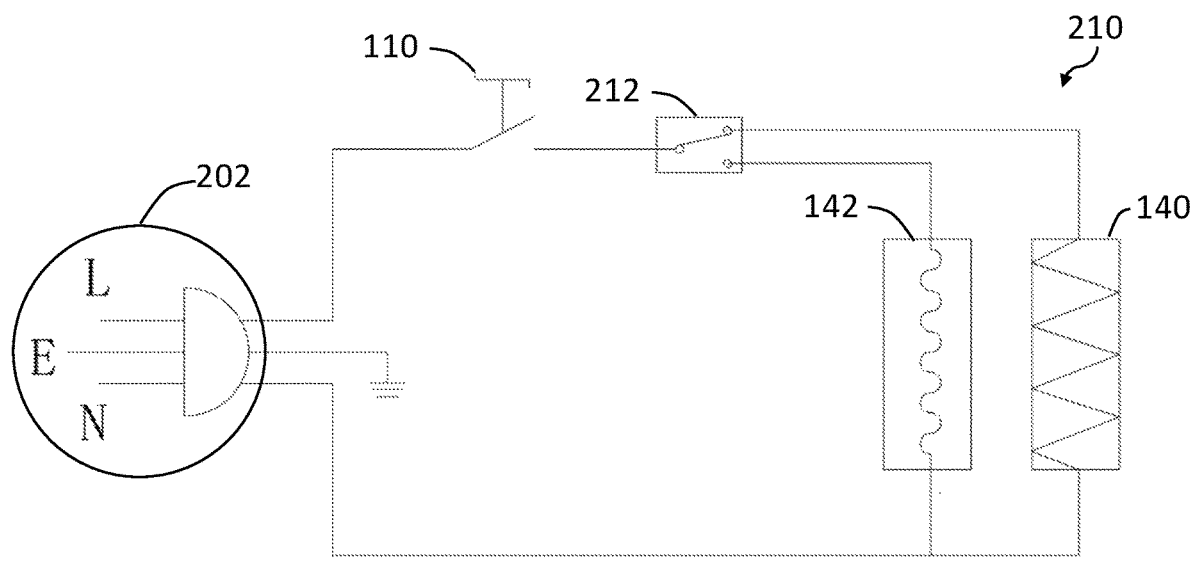
FIG. 11 shows an electrical circuit diagram of a portable electric grill including a selector switch as disclosed herein and in accordance with various embodiments.

With now reference to FIG. 11, a further illustrative electrical circuit diagram 210 of the portable electric grill 100 is shown. In various embodiments, the portable electric grill 100 can comprise a power supply 202, the temperature controlling component 110, a cooking function component 212, the first heating element 140, and the second heating element 142. The power supply 202 can be coupled, as described herein, to a wall outlet by way of the power cable 134. The power supply 202 can supply power to the temperature controlling component 110, the cooking function component 212, the first heating element 140, and the second heating element 142. The cooking function component 212 may comprise a switch, knob, or similar selector configured to allow electricity to flow to the first heating element 140, the second heating element 142, and any combination thereof. In various embodiments, and during operation, an operator of the portable electric grill 100 can adjust the temperature controlling component 110 (e.g., by way of the knob 114) to adjust the operating temperature of the portable electric grill 100. The first heating element, the second heating element 142, and any combination thereof can supply heat to the portable electric grill 100 based upon the cooking input received at the cooking function component 212, and in response to a temperature detected or measured by a thermostat or thermocouple of the temperature controlling component 110.

Figure 12:
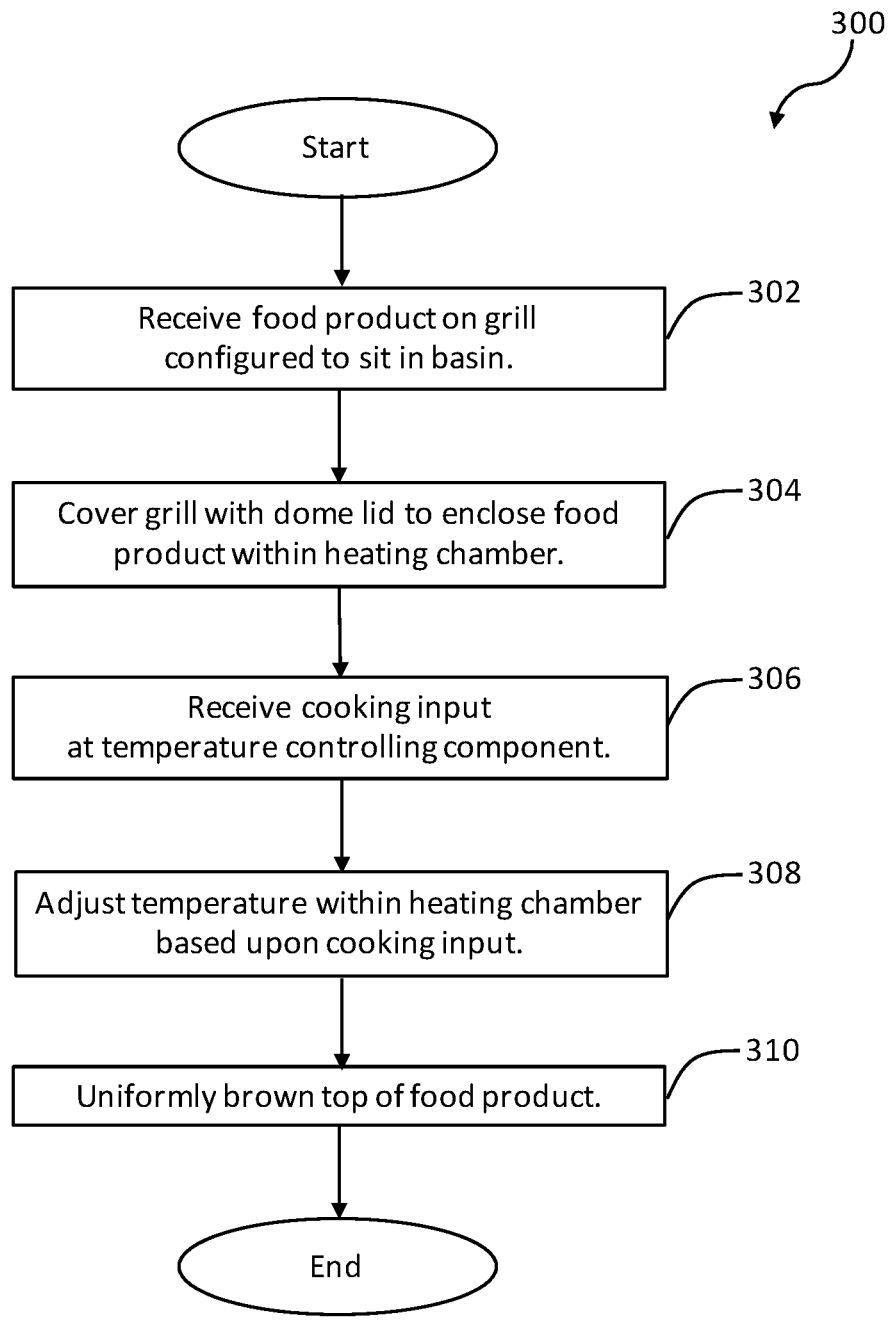
FIG. 12 shows an illustrative method of cooking using the illustrative portable electric grill.

Referring now to FIG. 12, a method 300 for cooking a food product with a portable electric grill 100 is shown. In various embodiments, the process 1400 can comprise receiving a food product on the grill 122 that is configured to sit in the basin 104 (step 302). The basin 104 can be covered by the dome lid 102, and the food product can be enclosed within the heating chamber defined between the basin 104 and the dome lid 102 (step 304). A cooking input (e.g., a cooking temperature, a desired doneness, a degree of browning, etc.) can be input and received by the temperature controlling component 110 (step 306). The temperature controlling component 110 can include the first heating element 140, the second heating element, and any combination thereof, and the temperature controlling component 110 can adjust the heat output by the first heating element 140 and/or the second heating element 142 based upon the cooking input (step 308). Thus, the portable electric grill 100 can cook and/or brown a food product to a desired and/or selected temperature, doneness, degree of browning, etc. As described herein, the food product (e.g., the top of the food product) may further be uniformly browned by the portable electric grill 100 (step 310).

Figure 13:
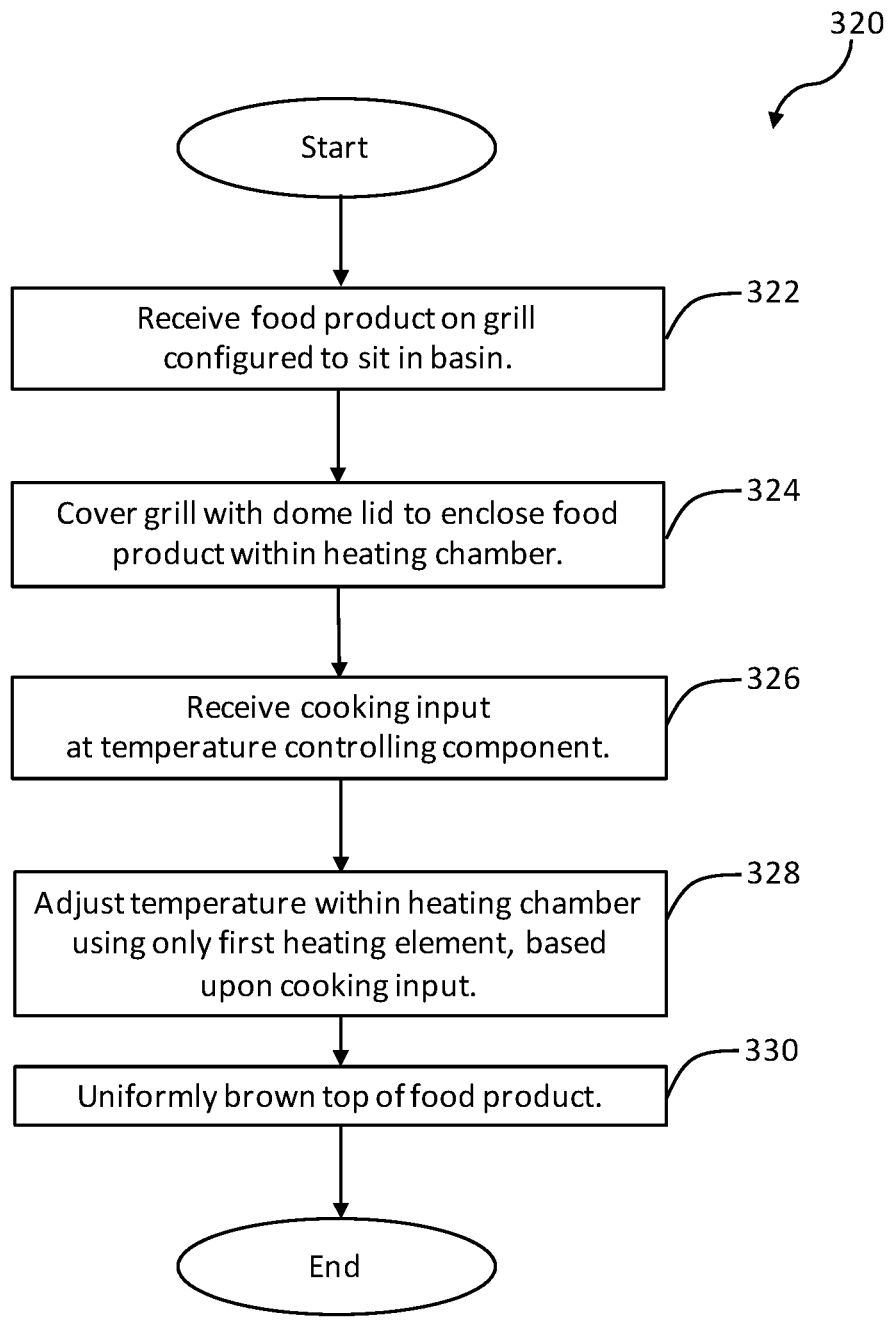
FIG. 13 shows an illustrative method of cooking using the illustrative portable electric grill using only the first heating element.
Figure 14:
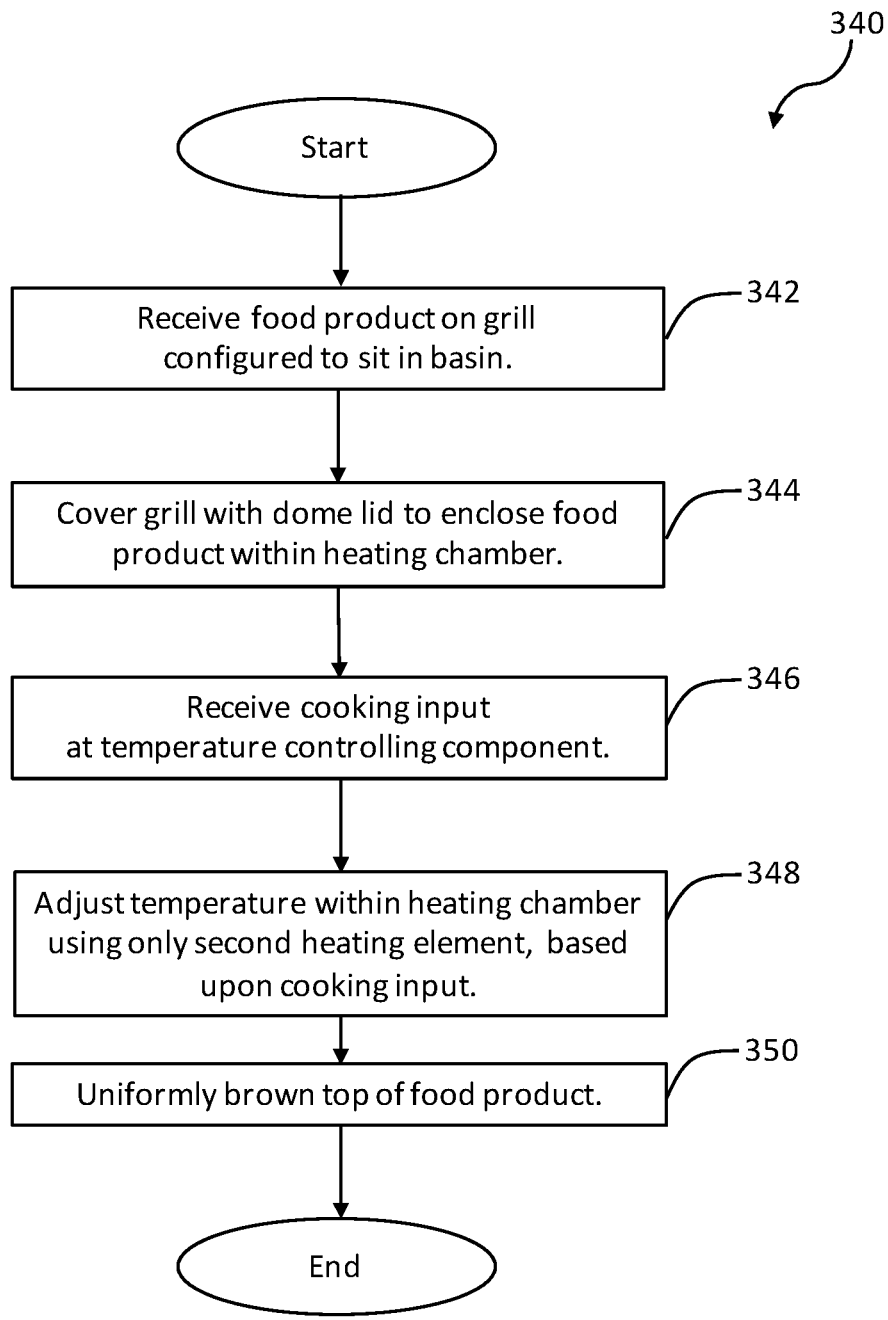
FIG. 14 shows an illustrative method of cooking using the illustrative portable electric grill using only the second heating element.

Referring now to FIG. 13, a method 300 for cooking a food product with a portable electric grill 100 is shown. In various embodiments, the process 1400 can comprise receiving a food product on the grill 122 that is configured to sit in the basin 104 (step 322). The basin 104 can be covered by the dome lid 102, and the food product can be enclosed within the heating chamber defined between the basin 104 and the dome lid 102 (step 324). A cooking input (e.g., a cooking temperature, a desired doneness, a degree of browning, etc.) can be input and received by the temperature controlling component 110 (step 326). The temperature controlling component 110 can adjust the heat output by the first heating element 140 based upon the cooking input (step 328). Thus, the portable electric grill 100 can cook and/or brown a food product to a desired and/or selected temperature, doneness, degree of browning, etc. As described herein, the food product (e.g., the top of the food product) may further be uniformly browned by the portable electric grill 100 (step 330).

Referring now to FIG. 13, a method 300 for cooking a food product with a portable electric grill 100 is shown. In various embodiments, the process 1400 can comprise receiving a food product on the grill 122 that is configured to sit in the basin 104 (step 322). The basin 104 can be covered by the dome lid 102, and the food product can be enclosed within the heating chamber defined between the basin 104 and the dome lid 102 (step 324). A cooking input (e.g., a cooking temperature, a desired doneness, a degree of browning, etc.) can be input and received by the temperature controlling component 110 (step 326). The temperature controlling component 110 can adjust the heat output by the second heating element 142 based upon the cooking input (step 328). Thus, the portable electric grill 100 can cook and/or brown a food product to a desired and/or selected temperature, doneness, degree of browning, etc. As described herein, the food product (e.g., the top of the food product) may further be uniformly browned by the portable electric grill 100 (step 330).

The portable electric grill 100 disclosed herein can therefore cook as well as uniformly brown a food product. More particularly, the outer surfaces (including a top surface, such as a turkey breast) of a food product can be uniformly browned by the portable electric grill 100, because the first heating element 140 is disposed within the dome lid 102, such that heat radiates away from the top of the inner dome lid wall 148 and down over the food product. The first heating element 140 is further enclosed within the dome lid 102, so that heat is not directly applied to the food product, but indirectly, as it circulates within the dome lid 102. Moreover, because the dome lid 102 is large and extends over and around a large portion of the food product, the portable electric grill 100 is capable of both browning a top surface (and side and/or other surfaces) of the food product as well as cooking the food product to a desired temperature or doneness.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A portable electric grill comprising:
a double walled dome lid having a perimeter, said double walled dome lid including a dome lid inner wall and a dome lid outer wall, wherein the dome lid inner wall and dome lid outer wall are joined at a base of the double walled dome lid;
a basin having a cavity, the basin interfacing with the base of the double walled dome lid, the basin including a hinge coupling the basin and the double walled dome lid;
a grill configured to interface with the basin cavity;
a first heating element comprising a heating belt extending from said base that is radially disposed about an exterior surface of the dome lid inner wall along the entire perimeter, and wherein the heating element is positioned within the dome lid outer wall;
a second heating element that is disposed within the basin cavity and spaced from the grill;
a temperature controlling component electrically coupled to the first heating element and the second heating element, said temperature controlling component allowing for selective operation of said first and second heating elements, wherein in a first mode of operation said first heating element is activated, in a second mode of operation said second heating element is activated, and in a third mode of operation both said first and said second heating elements are activated;
a junction box mounted on a rear portion of said double walled dome lid, said junction box receiving a power cable, leads from said first and second heating element, and a communication cable connected with said temperature controlling component; and
a support configured to interface with a surface.

2. The portable electric grill of claim 1 wherein the basin further including a drain.

3. The portable electric grill of claim 1 wherein the grill is an aluminum hot plate.

4. The portable electric grill of claim 1 wherein the support includes a plurality of legs, each leg having a hinge.

5. The portable electric grill of claim 1 wherein the support includes a pedestal.

6. The portable electric grill of claim 5 wherein the pedestal includes an oil reservoir operatively coupled to a drain in the basin.

7. The portable electric grill of claim 1 wherein insulating material is radially disposed about said first heating element and positioned within the dome lid outer wall, wherein a top of the double walled dome does not include insulating materials.

8. The portable electric grill of claim 1 further wherein the first heating element is not disposed in a top portion of said double walled dome lid.

9. The portable electric grill of claim 1 wherein the temperature controlling component includes a thermostat.

10. The portable electric grill of claim 1 wherein the temperature controlling component includes a thermocouple.

11. The portable electric grill of claim 5 wherein a bottom of said basin includes mounting studs configured to interface with a pedestal mounting bracket within said pedestal.

12. A method for cooking with a portable electric grill, the method comprising,
receiving a food product on a grill, the grill interfacing with a basin, the basin having a cavity and a support;
covering the grill with a double walled dome lid having a perimeter, said double walled dome lid including a dome lid inner wall and a dome lid outer wall, wherein the dome lid inner wall and dome lid outer wall are joined at a base of the double walled dome lid, further wherein the base interfaces with the basin to form a cooking chamber;
receiving a cooking input at a temperature controlling component that includes a first heating element and a second heating element, wherein the first heating element comprises a heating belt extending from said base and being radially disposed about an exterior surface of the dome lid inner wall along the entire perimeter, the heating belt positioned within the dome lid outer wall, and the second heating element is disposed within the basin cavity, the second heating element being spaced from the grill, said temperature controlling component allowing for selective operation of said first and second heating elements, wherein in a first mode of operation said first heating element is activated, in a second mode of operation said second heating element is activated, and in a third mode of operation both said first and said second heating elements are activated; and
heating the cooking chamber with at least one of the first heating element and the second heating element in said first mode of operation, said second mode of operation, or said third mode of operation, so that the food product is uniformly cooked.

13. The method for cooking with the portable electric grill of claim 12 wherein the grill is an aluminum hot plate.

14. The method for cooking with the portable electric grill of claim 12 wherein the first heating element includes said heating belt and an insulating material is radially disposed about said first heating element and positioned within the dome lid outer wall, and wherein a top of the double walled dome does not include insulating materials.

15. The method for cooking with the portable electric grill of claim 12 wherein the first heating element includes said heating belt and an insulating material is disposed between the dome lid inner wall and the dome lid outer wall.

16. The method for cooking with the portable electric grill of claim 12 wherein the temperature controlling component includes a thermostat.

17. The method for cooking with the portable electric grill of claim 12 wherein the temperature controlling component includes a thermocouple.

18. The method for cooking with portable electric grill of claim 12 wherein the basin further includes a drain.

19. The method for cooking with portable electric grill of claim 12 wherein the support includes a plurality of legs, each leg having a hinge.

20. The method for cooking with portable electric grill of claim 12 wherein the support includes a pedestal, and a bottom of said basin includes mounting studs configured to interface with a pedestal mounting bracket within said pedestal.

* * * * *